(12) United States Patent
Escolar-Piedras

(10) Patent No.: US 8,331,468 B2
(45) Date of Patent: Dec. 11, 2012

(54) APPARATUS AND METHOD FOR INSERTING A CYCLIC POSTFIX FOR A TIME-ROTATED SYMBOL IN A COMMUNICATION SYSTEM

(75) Inventor: Alberto Escolar-Piedras, Oulu (FI)

(73) Assignee: Nokia Corporation, Espoo (FI)

( * ) Notice: Subject to any disclaimer, the term of this patent is extended or adjusted under 35 U.S.C. 154(b) by 861 days.

(21) Appl. No.: 12/474,947

(22) Filed: May 29, 2009

(65) Prior Publication Data

US 2010/0303166 A1 Dec. 2, 2010

(51) Int. Cl.
*H04B 7/02* (2006.01)
(52) U.S. Cl. ......................... 375/260; 375/295
(58) Field of Classification Search .................. 375/260, 375/295, 267; 370/210, 208, 330, 203; 708/403, 708/404, 405
See application file for complete search history.

(56) References Cited

U.S. PATENT DOCUMENTS

| | | | |
|---|---|---|---|
| 6,687,307 B1* | 2/2004 | Anikhindi et al. | 375/260 |
| 2005/0068886 A1* | 3/2005 | Wang et al. | 370/210 |
| 2005/0276337 A1* | 12/2005 | Khan | 375/260 |
| 2008/0002645 A1* | 1/2008 | Seki et al. | 370/338 |
| 2008/0165676 A1 | 7/2008 | Kang et al. | |
| 2008/0222482 A1* | 9/2008 | Ban | 714/752 |
| 2009/0074106 A1* | 3/2009 | See et al. | 375/297 |
| 2009/0245399 A1* | 10/2009 | Lee et al. | 375/260 |
| 2009/0245422 A1* | 10/2009 | Sampath et al. | 375/302 |
| 2011/0096861 A1* | 4/2011 | Green | 375/295 |

FOREIGN PATENT DOCUMENTS

| | | | |
|---|---|---|---|
| WO | WO 2005/022794 A2 | | 3/2005 |
| WO | WO 2007/123340 A2 | | 11/2007 |
| WO | WO 2008/056900 A1 | | 5/2008 |

OTHER PUBLICATIONS

Dong Li, Penghui Wei and Xiaolong Zhu, "Novel Space-Time Coding and Mapping Scheme in Single-Carrier FDMA Systems", Alcatel Shanghai Bell, China, 2007, IEEE.*
U.S. Appl. No. 12/069,239, filed Feb. 8, 2008, Zielinski, et al.
Sari, H., et al., "Transmission Techniques for Digital Terrestrial TV Broadcasting," IEEE, Feb. 1995, pp. 100-109.

* cited by examiner

*Primary Examiner* — Aristocratis Fotakis
(74) *Attorney, Agent, or Firm* — Squire Sanders (US) LLP

(57) ABSTRACT

An apparatus and method for inserting a cyclic postfix for a time-rotated symbol in a communication system. In one embodiment, the apparatus includes a time pre-rotation module configured to time shift bits of at least one of ending samples of a symbol to a beginning of the symbol to form a time-rotated symbol. The apparatus also includes an interpolator configured to construct an up-sampled symbol from the time-rotated symbol and a cyclic postfix module configured to insert a cyclic postfix at an end of the up-sampled symbol to form an expanded up-sampled symbol.

15 Claims, 10 Drawing Sheets

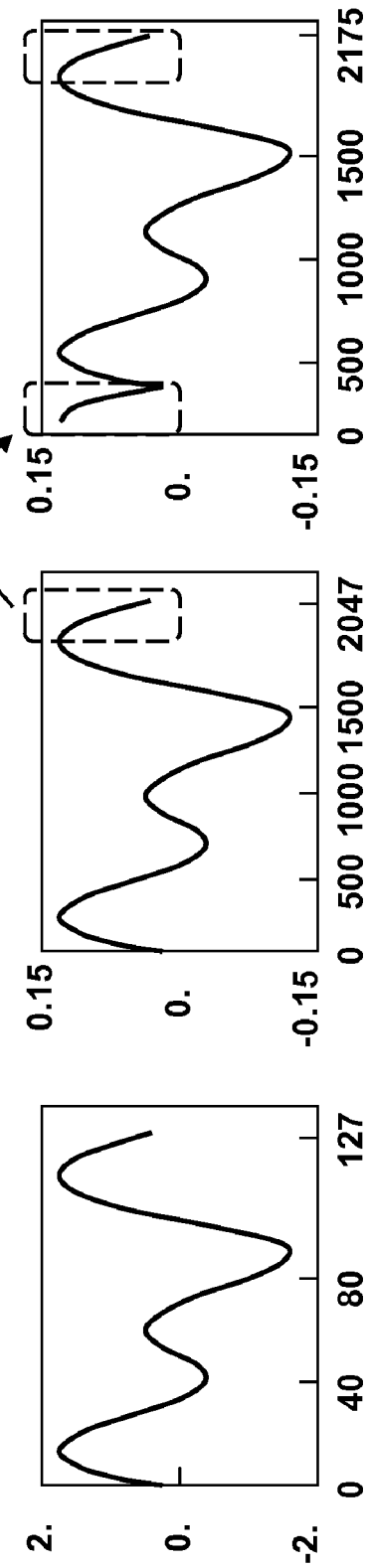

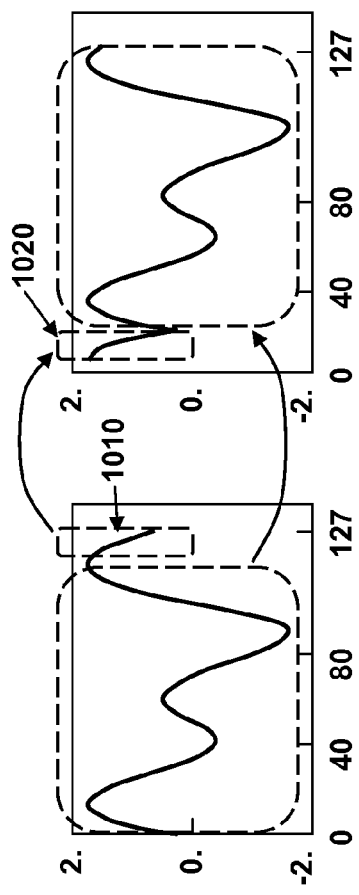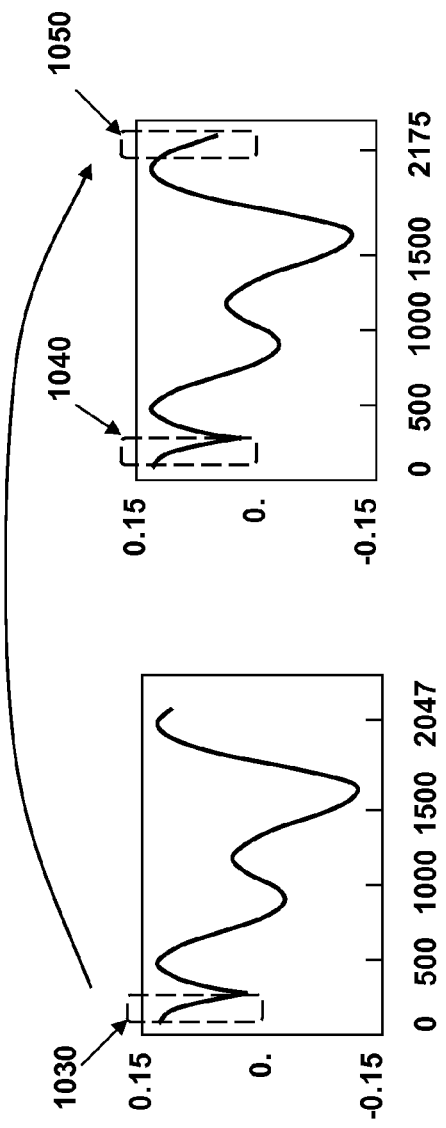
FIGURE 10A
FIGURE 10B
FIGURE 10C
FIGURE 10D

APPARATUS AND METHOD FOR INSERTING A CYCLIC POSTFIX FOR A TIME-ROTATED SYMBOL IN A COMMUNICATION SYSTEM

TECHNICAL FIELD

The present invention is directed, in general, to communication systems and, in particular, to an apparatus and method for inserting a cyclic postfix for a time-rotated symbol in a single-carrier frequency division multiple access ("SC-FDMA") communication system.

BACKGROUND

Long term evolution ("LTE") of the Third Generation Partnership Project ("3GPP"), also referred to as 3GPP LTE, refers to research and development involving the 3GPP Release 8 and beyond, which is the name generally used to describe an ongoing effort across the industry aimed at identifying technologies and capabilities that can improve systems such as the universal mobile telecommunication system ("UMTS"). The goals of this broadly based project include improving communication efficiency, lowering costs, improving services, making use of new spectrum opportunities, and achieving better integration with other open standards. The 3GPP LTE project is not itself a standard-generating effort, but will result in new recommendations for standards for the UMTS.

The evolved UMTS terrestrial radio access network ("E-UTRAN") in 3GPP includes base stations providing user plane (including packet data convergence protocol/radio link control/medium access control/physical ("PDCP/RLC/MAC/PHY") sublayers) and control plane (including radio resource control ("RRC") sublayer) protocol terminations towards wireless communication devices such as cellular telephones. A wireless communication device or terminal is generally known as user equipment ("UE") or a mobile station ("MS"). A base station is an entity of a communication network often referred to as a Node B or an NB. Particularly in the E-UTRAN, an "evolved" base station is referred to as an eNodeB or an eNB. For details about the overall architecture of the E-UTRAN, see 3GPP Technical Specification ("TS") 36.300, v8.5.0 (2008-05), which is incorporated herein by reference. The terms base station, NB, eNB, and cell refer generally to equipment providing the wireless-network interface in a cellular telephone system, and will be used interchangeably herein, and include cellular telephone systems other than those designed under 3GPP standards.

Orthogonal frequency division multiplex(ing) ("OFDM") is a multi-carrier data transmission technique that is advantageously used in radio frequency based transmitter-receiver systems such as 3GPP E-UTRAN/LTE/3.9G, IEEE 802.16d/e (Worldwide Interoperability for Microwave Access ("WiMAX")), IEEE 802.11a/WiFi, fixed wireless access ("FWA"), HiperLAN2, digital audio broadcast ("DAB"), digital video broadcast ("DVB"), and others including wired digital subscriber lines ("DSLs"). The OFDM systems typically divide available frequency spectrum into a plurality of carriers. Each of the plurality of carriers has a narrow bandwidth and is modulated with a low-rate data stream. The carriers are closely spaced and orthogonal separation of the carriers controls inter-carrier interference ("ICI").

When generating an OFDM signal, each carrier is assigned a data stream that is converted to samples from a constellation of admissible sample values based on a modulation scheme such as quadrature amplitude modulation ("QAM," and its higher-order variants 16QAM, 64QAM, etc), quadrature phase shift key ("QPSK"), and the like. Once phases and amplitudes are determined for the particular samples, they are converted to time-domain signals for transmission. A sequence of samples, such as a 128-sample sequence, is collectively assembled into a "symbol." Typically, OFDM systems use an inverse discrete Fourier transform ("iDFT") such as an inverse fast Fourier transform ("iFFT") to perform conversion of the symbols to a sequence of time-domain sample amplitudes that are employed to form a time domain transmitted waveform. The iFFT is an efficient process to map data onto orthogonal subcarriers. The time domain waveform is then up-converted to the radio frequency ("RF") of the appropriate carrier and transmitted.

Delay in processing the signal in the transmitter is a concern in the design of communication systems for several reasons. First, in the case wherein the user equipment transmits the signal, the symbols should be received at the base station within a certain window of time, which the base station assures by sending a particular timing advance to the user equipment in its cell. Second, multi-path delay interference in the transmitted symbols causes inter-symbol interference ("ISI") between a reflected radio signal and the direct radio signal. A cyclic prefix ("CP") is a sequence of samples inserted before a symbol to separate a sequence of symbols and avoid inter-symbol interference. The time interval a cyclic prefix occupies is referred to as a guard interval ("GI"). The cyclic prefix is generally just a repetition of the ending samples of the symbol that are added at the beginning of the symbol. Inserting the cyclic prefix should be performed in a manner so that the transmitted signal is sent with the proper timing advance. To achieve a reasonable throughput, the OFDM symbol duration may be at least five times the guard interval and to avoid inter-carrier interference, the OFDM symbol is cyclically expanded in the guard interval. A cyclic prefix makes distortion effects of the channel multiplicative, thereby allowing easy compensation of channel effects at the receiver.

The cyclic prefix insertion is conventionally performed as follows. An iFFT has an associated "length" corresponding to a number of coefficients for the iFFT transform. The cyclic prefix is generated by placing the last few iFFT output coefficients (time-domain signal amplitudes) at the beginning of the symbol to form the cyclic prefix. The size of the cyclic prefix varies in different applications. For example, in LTE with a normal cyclic prefix, for an iFFT with a length "N" of 2048 coefficients, the iFFT output corresponding to the last 144 coefficients is transmitted first as the cyclic prefix, and then the output corresponding to the 2048 coefficients of the entire iFFT is output in normal order, for a total of 2048+144=2192 coefficients. For the addition of a cyclic prefix in conventional systems, the iFFT output requires relatively large buffers. If the output of the iFFT is in bit-reversed time order, then two buffers of size N are required. If the output of the iFFT is in normal time order, then a single buffer of the length N of the iFFT can be used. In either case, buffers add expense to the communication system.

Conventional multicarrier OFDM systems have a particular drawback of a high peak-to-average ratio ("PAR") in the resulting transmitted waveform, thereby increasing requirements on the power amplifiers of the transmitter such as amplifier linearity and amplifier peak power rating. The need to transmit a waveform with a high peak-to-average ratio is usually not acceptable for handheld devices such as user equipment, and thus single carrier-frequency division multiple access ("SC-FDMA") systems are often used for the link from the user equipment to the base station. The SC-FDMA systems retain many of the beneficial characteristics of the OFDM systems.

As these communication systems become more complex, the length of each of the symbols increases. In 3GPP LTE, the symbol length is 2048 samples when the cell bandwidth is 20 megahertz ("MHz"). A process for appending a cyclic prefix to a symbol to form an extended (i.e., cyclic prefix-expanded) symbol includes calculating the whole symbol in time and buffering the same during the calculation and processing of the symbol. After the symbol has been calculated and processed, the ending samples of the symbol are taken from the buffer, which are then transmitted first as the cyclic prefix, followed by transmitting the whole symbol.

Appending the cyclic prefix in this way requires the whole symbol to be calculated before its transmission can start. This delay reduces signal-processing margin for other communication operations. As an example for an LTE communication system, the roundtrip delay is four milliseconds ("ms"), which is the time between a base station transmitting a (sub) frame, user equipment receiving and processing the (sub) frame, the user equipment transmitting a response and the base station receiving the response.

When appending the cyclic prefix in this way, the whole symbol also should be buffered before a transmission can start. This means a buffer of the size of at least one symbol. In an optimal arrangement, a buffer corresponding to the cyclic prefix length would be sufficient. In a worst case, at least one quarter of the symbol length would be required, and depending on the particular implementation, a buffer sufficient to store two symbols would be necessary. Thus, reducing buffering requirements and processing latency associated with insertion of a cyclic prefix in high-frequency digital communication systems would provide an advantageous level of operation.

In view of the growing deployment and sensitivity to delays of communication systems such as cellular communication systems, further improvements are necessary for reducing buffering requirements and processing latency associated with insertion of a cyclic prefix. Therefore, what is needed in the art is a system and method that avoid the associated deficiencies of conventional communication systems in accordance with the insertion of a cyclic prefix and the like.

SUMMARY OF THE INVENTION

These and other problems are generally solved or circumvented, and technical advantages are generally achieved, by embodiments of the present invention, which include an apparatus and method for inserting a cyclic postfix for a time-rotated symbol in a communication system such as a single-carrier frequency division multiple access ("SC-FDMA") communication system. In one embodiment, the apparatus (e.g., user equipment or a base station) includes a time pre-rotation module configured to time shift bits of at least one of ending samples of a symbol to a beginning of the symbol to form a time-rotated symbol. The apparatus also includes an interpolator configured to construct an up-sampled symbol from the time-rotated symbol and a cyclic postfix module configured to insert a cyclic postfix at an end of the up-sampled symbol to form an expanded up-sampled symbol.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which:

FIGS. 9A to 9C illustrate diagrams demonstrating exemplary waveforms corresponding to the conventional SC-FDMA communication system of FIG. 8C; and FIGS. 10A to 10D illustrate diagrams demonstrating exemplary waveforms corresponding to a system for generating an expanded symbol including a cyclic postfix in accordance with the principles of the present invention of FIG. 8D.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of a system and method for reducing buffering requirements and processing latency associated with the insertion of a cyclic prefix by inserting a cyclic postfix in a communication system. Although processes, methods and systems described herein are described with reference to a 3GPP LTE communication system, they can be applied to any communication element including a SC-FDMA (or similar) communication element. Also, for information on cyclic prefixes in accordance with OFDM systems, see "Transmission Techniques for Digital Terrestrial TV Broadcasting," by Sari, et al., IEEE Communications Magazine (February 1995), and for a related application directed to the insertion of cyclic prefixes with reduced latency and buffering requirements, see U.S. application Ser. No. 12/069,239, entitled "Frequency Dependent Phase Rotation Prior to Mapping in an OFDM Transmitter," by Zielinski, et al., filed Feb. 8, 2008, both of which are incorporated herein by reference.

Figure 1:
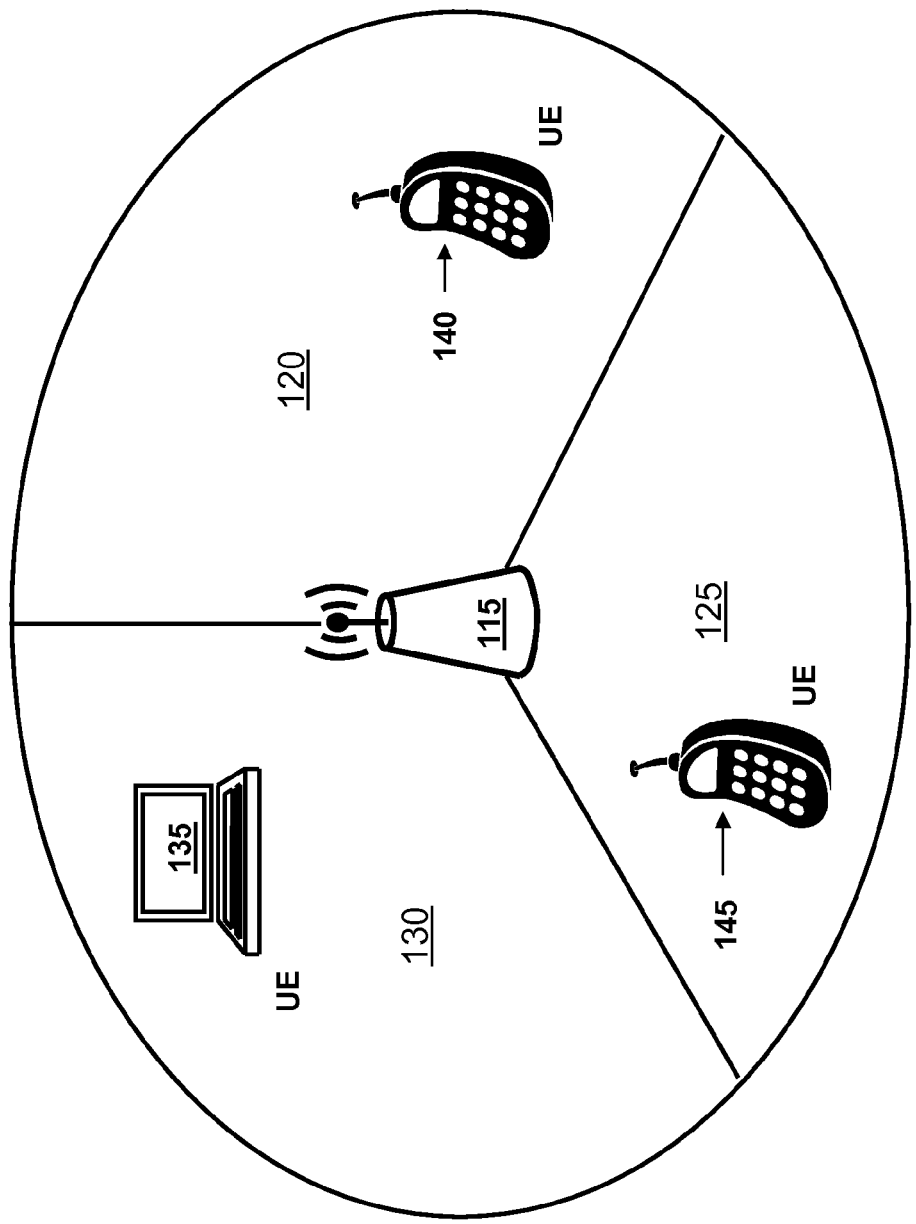
FIGS. 1 and 2 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station 115 and wireless communication devices (e.g., user equipment) 135, 140, 145 that provides an environment for application of the principles of the present invention. The base station 115 is coupled to an Internet protocol network, data network, or public switched telephone network (not shown). The base station 115 is configured with a plurality of antennas to transmit and receive signals in a plurality of sectors including a first sector 120, a second sector 125, and a third sector 130, each of which typically spans 120 degrees. The sectors are formed by focusing and phasing the radiated and received signals from the base station antennas. The plurality of sectors increases the number of subscriber stations (e.g., the wireless communication devices 135, 140, 145) that can simultaneously communicate with the base station 115 without the need to increase the utilized bandwidth by reduction of interference that results from focusing and phasing base station antennas. The radiated and received frequencies utilized by the communication system illustrated in FIG. 1 would typically be two gigahertz to provide non-line-of-sight communication.

Figure 2:
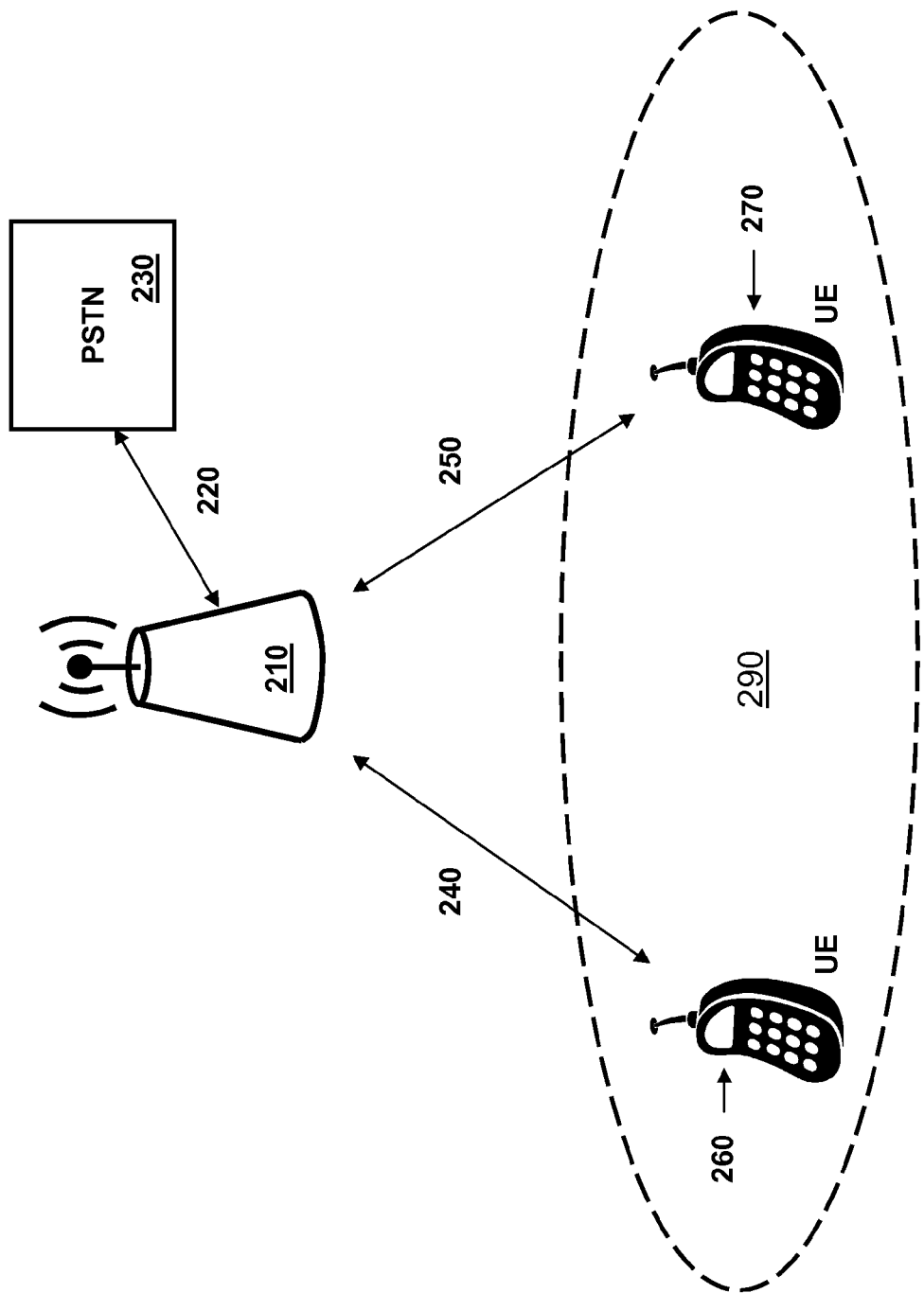

Turning now to FIG. 2, illustrated is a system level diagram of an embodiment of a communication system including wireless communication devices that provides an environment for application of the principles of the present invention. The communication system includes a base station 210 coupled by communication path or link 220 (e.g., by a fiber-optic communication path) to a core telecommunications network such as public switched telephone network ("PSTN") 230. The base station 210 is coupled by wireless communication paths or links 240, 250 to wireless communication devices 260, 270, respectively that lie within its cellular area 290.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in frequency division duplex ("FDD") and/or time division duplex ("TDD") communication modes.

Figure 3:
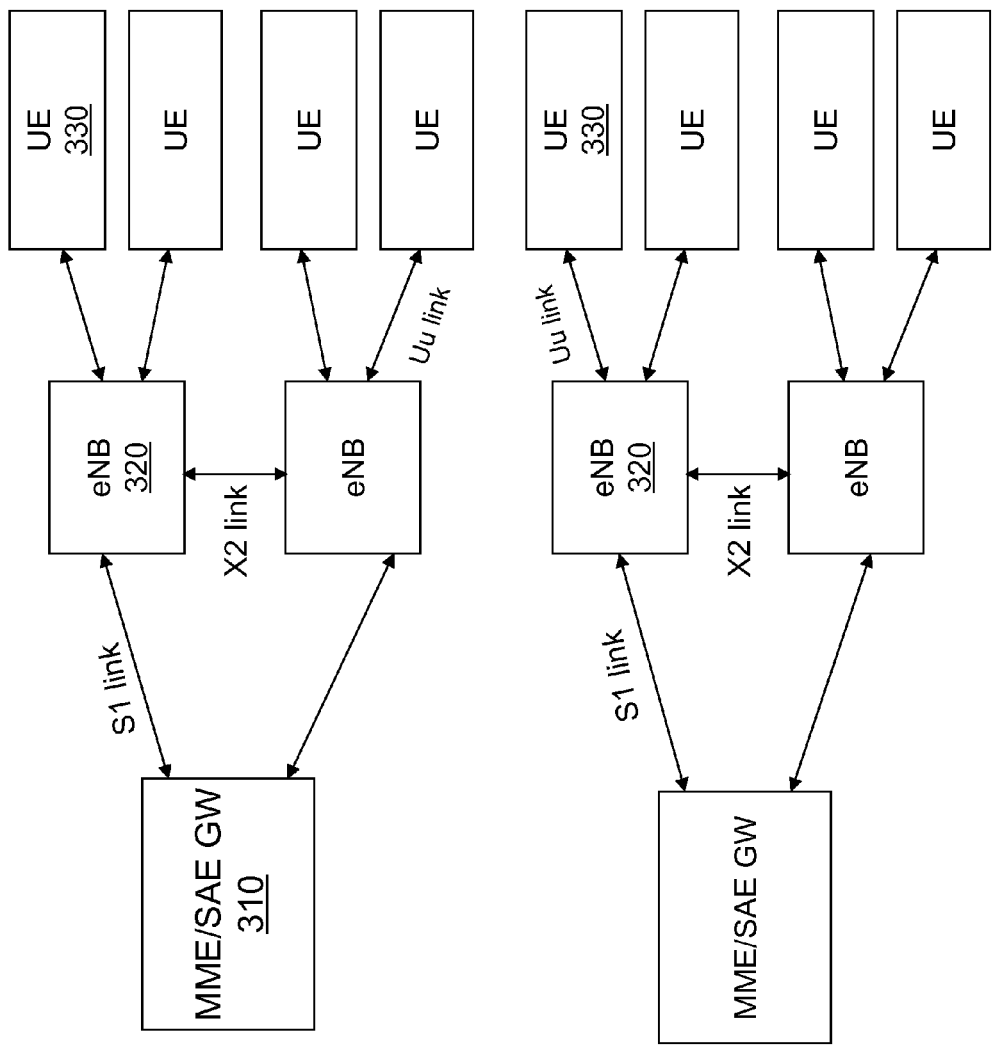
FIGS. 3 and 4 illustrate system level diagrams of embodiments of communication systems including a wireless communication system that provide an environment for application of the principles of the present invention.

Turning now to FIG. 3, illustrated is a system level diagram of an embodiment of a communication system including a wireless communication system that provides an environment for the application of the principles of the present invention. The wireless communication system may be configured to provide evolved UMTS terrestrial radio access network ("E-UTRAN") universal mobile telecommunications services. A mobile management entity/system architecture evolution gateway ("MME/SAE GW," one of which is designated 310) provides control functionality for an E-UTRAN node B (designated "eNB" in FIG. 3), one of which is designated 320) via an S1 communication link (ones of which are designated "S1 link"). The base stations 320 communicate via X2 communication links (designated "X2 link"). The various communication links are typically fiber, microwave, or other high-frequency metallic communication paths such as coaxial links, or combinations thereof.

The base stations 320 communicate with user equipment (ones of which are designated 330), which is typically a mobile transceiver carried by a user. Thus, communication links (designated "Uu" communication links, ones of which are designated "Uu link") coupling the base stations 320 to the user equipment 330 are air links employing a wireless communication signal such as, for example, an orthogonal frequency division multiplex ("OFDM") signal.

Figure 4:
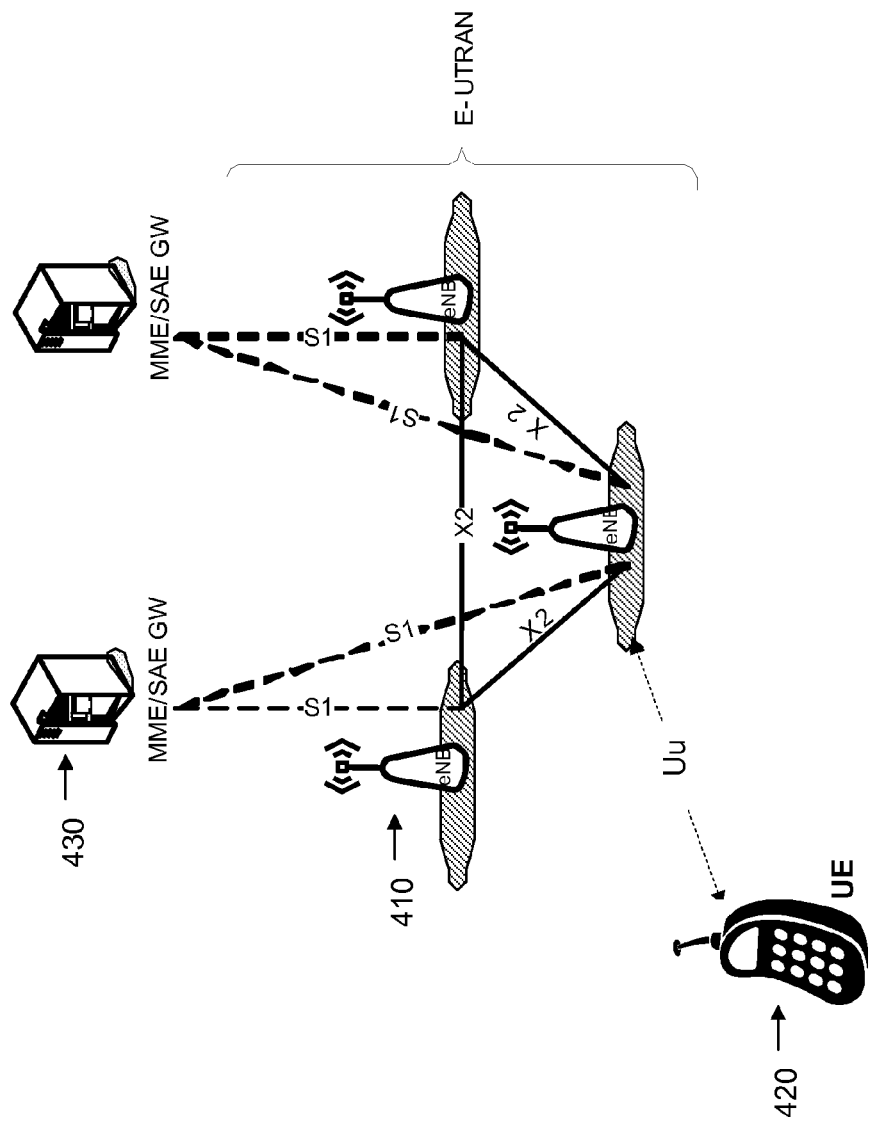

Turning now to FIG. 4, illustrated is a system level diagram of an embodiment of a communication system including a wireless communication system that provides an environment for the application of the principles of the present invention. The wireless communication system provides an E-UTRAN architecture including base stations (one of which is designated 410) providing E-UTRAN user plane (packet data convergence protocol/radio link control/media access control/physical) and control plane (radio resource control) protocol terminations towards user equipment 420. The base stations 410 are interconnected with X2 interfaces or communication links (designated "X2"). The base stations 410 are also connected by S1 interfaces or communication links (designated "S1") to an evolved packet core ("EPC") including a mobile management entity/system architecture evolution gateway ("MME/SAE GW," one of which is designated 430). The S1 interface supports a multiple entity relationship between the mobile management entity/system architecture evolution gateway 430 and the base stations 410. For applications supporting inter-public land mobile handover, inter-eNB active mode mobility is supported by the mobile management entity/system architecture evolution gateway 430 relocation via the S1 interface.

The base stations 410 may host functions such as radio resource management. For instance, the base stations 410 may perform functions such as internet protocol ("IP") header compression and encryption of user data streams, ciphering of user data streams, radio bearer control, radio admission control, connection mobility control, dynamic allocation of resources to user equipment in both the uplink and the downlink, selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 430 may host functions such as distribution of paging messages to the base stations 410, security control, termination of U-plane packets for paging reasons, switching of U-plane for support of the user equipment mobility, idle state mobility control, and system architecture evolution bearer control. The user equipment 420 receives an allocation of a group of information blocks including data sequences from the base stations 410.

As well understood, the data sequences are formed by a plurality of symbols, which are formed by a plurality of samples formed from bit(s). As introduced herein, a rotation of the samples in the time domain is performed on an input symbol so that after iDFT processing, the cyclic prefix appears in time at the beginning of the iDFT processed symbol. The cyclic prefix can then be re-appended as a postfix to the iDFT-processed symbol to produce a cyclic postfix expanded symbol. Instead of applying a conventional modification in the frequency domain just before the iDFT as described in U.S. Pat. No. 6,687,307, entitled "Low Memory and Low Latency Cyclic Prefix Addition," by Anikhindi, et al., ("Anikhindi"), issued Feb. 3, 2004, which is incorporated herein by reference, an equivalent time pre-rotation is applied before a discrete Fourier transform ("DFT"). The process is applicable to SC-FDMA communication systems or other communication systems. A compensation may be added when the DFT length is not an integer divider of the iDFT length.

Figure 5:
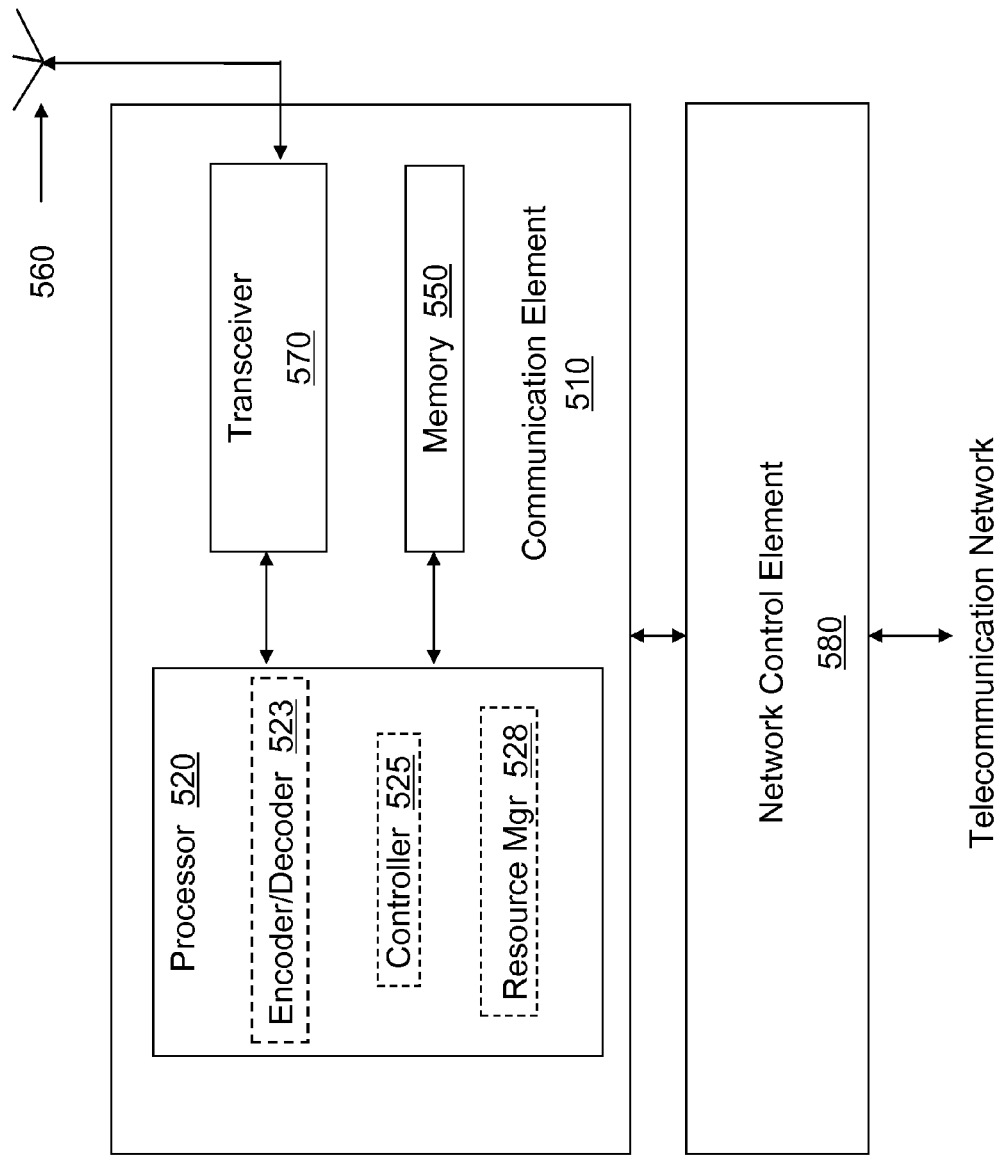
FIG. 5 illustrates a system level diagram of an embodiment of a communication element of a communication system for application of the principles of the present invention.

Turning now to FIG. 5, illustrated is an illustrative system level diagram of an embodiment of a communication element 510 of a communication system for application of the principles of the present invention. The communication element or device 510 may represent, without limitation, a base station, user equipment (e.g., a subscriber station, terminal, mobile station, a wireless communication device), a network control element, a communication node, or the like. The communication element 510 includes, at least, a processor 520, memory 550 that stores programs and data of a temporary or more permanent nature, an antenna 560, and a radio frequency transceiver 570 coupled to the antenna 560 and the processor 520 for bidirectional wireless communication. The communication element 510 may provide point-to-point and/or point-to-multipoint communication services.

The communication element 510, such as a base station in a cellular network, may be coupled to a communication network element, such as a network control element 580 of a public switched telecommunication network ("PSTN"). The network control element 580 may, in turn, be formed with a processor, memory, and other electronic elements (not shown). The network control element 580 generally provides access to a telecommunication network such as a PSTN. Access may be provided using fiber optic, coaxial, twisted pair, microwave communication, or similar link coupled to an appropriate link-terminating element. A communication element 510 formed as user equipment is generally a self-contained device intended to be carried by an end user.

The processor 520 in the communication element 510, which may be implemented with one or a plurality of processing devices, performs functions associated with its operation including, without limitation, encoding and decoding (encoder/decoder 523) of individual bits forming a communication message, formatting of information, and overall control (controller 525) of the communication element 510, including processes related to management of resources (resource manager 528). Exemplary functions related to management of resources include, without limitation, hardware installation, traffic management, performance data analysis, tracking of end users and equipment, configuration management, end user administration, management of user equipment, management of tariffs, subscriptions, and billing, and the like. For instance, in accordance with the memory 550, the resource manager 528 is configured to allocate time and frequency communication resources for transmission of data to/from the communication element 510 and format messages including the communication resources therefor. The processor 520 and/or the transceiver 570 further includes processes to advantageously reduce buffering requirements and processing latency associated with the insertion of a cyclic prefix by providing a cyclic postfix as described herein.

The execution of all or portions of particular functions or processes related to management of resources may be performed in equipment separate from and/or coupled to the communication element 510, with the results of such functions or processes communicated for execution to the communication element 510. The processor 520 of the communication element 510 may be of any type suitable to the local application environment, and may include one or more of general-purpose computers, special purpose computers, microprocessors, digital signal processors ("DSPs"), processors based on a multi-core processor architecture, and dedicated signal processing hardware, as non-limiting examples.

The transceiver 570 of the communication element 510 modulates information onto a carrier waveform for transmission by the communication element 510 via the antenna 560 to another communication element. The transceiver 570 demodulates information received via the antenna 560 for further processing by other communication elements.

The memory 550 of the communication element 510, as introduced above, may be of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 550 may include program instructions that, when executed by an associated processor, enable the communication element 510 to perform tasks as described herein. Of course, the memory 550 may form a data buffer for data transmitted to and from the communication element 510. Exemplary embodiments of the system, subsystems, and modules as described herein may be implemented, at least in part, by computer software executable by processors of, for instance, the user equipment and the base station, or by hardware, or by combinations thereof As will become more apparent, systems, subsystems and modules may be embodied in the communication element 510 as illustrated and described herein.

Figure 6:
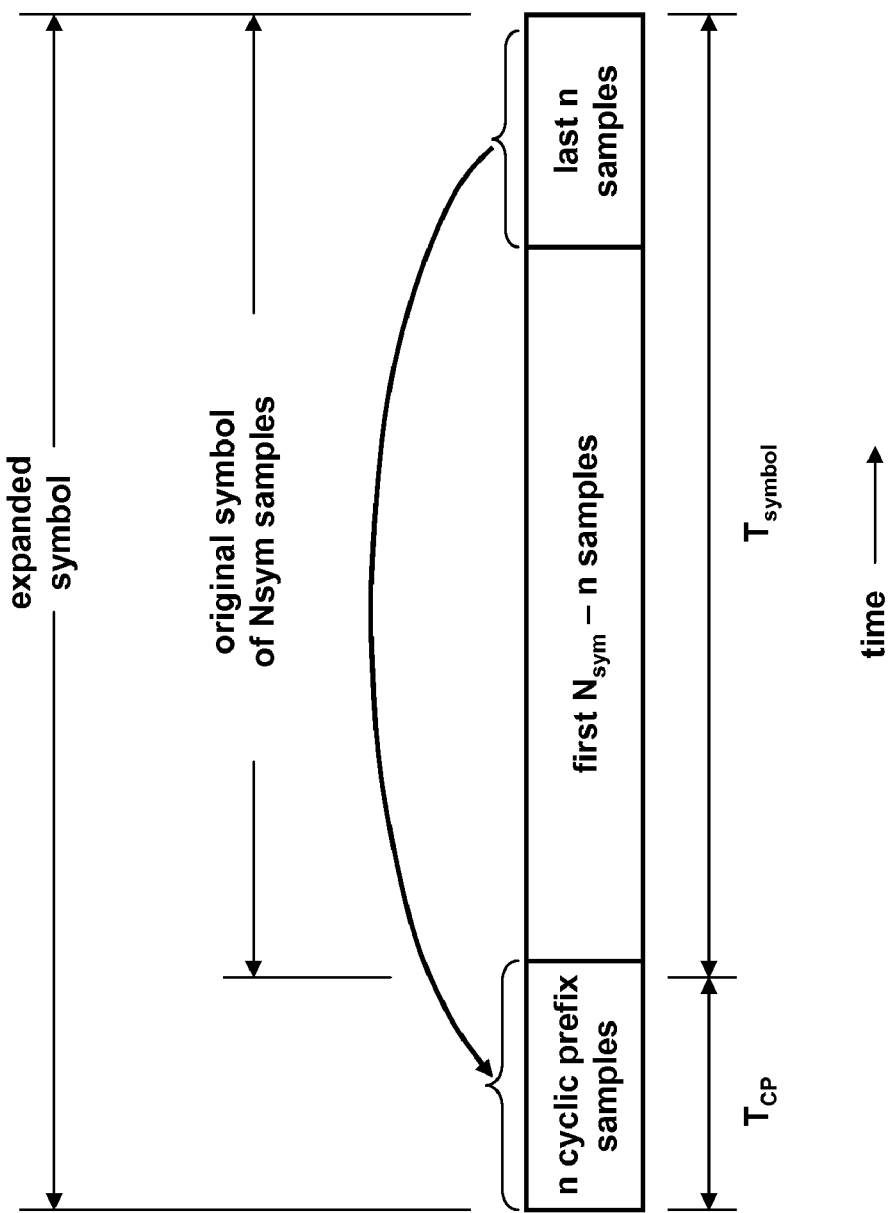
FIG. 6 illustrates a diagram of an expanded symbol demonstrating the concept of a cyclic prefix.

Turning now to FIG. 6, illustrated is a diagram of an expanded symbol demonstrating the concept of a cyclic prefix. A symbol consists of $N_{sym}$ samples that may represent encoded data (e.g., digital data) that may be, for example, a voice signal or any other kind of data, such as elements of a video frame. To form the expanded symbol including the cyclic prefix, the last n samples of the symbol are replicated and placed at the beginning of the expanded symbol. In FIG. 6, $T_{symbol}$ represents the time duration or, equivalently, the number of samples, of the original symbol, and $T_{CP}$ represents the time duration or, equivalently, the number of samples, of the cyclic prefix (or postfix).

The time pre-rotation before the DFT as introduced herein can be done with minimal processing resources by reordering the data before the DFT, which can be advantageously performed without additional memory and without introducing additional processing latency. Correcting the effect of a non-integer ratio between the DFT length and the iDFT length could be performed with the same systems, subsystems or modules employable to perform a subsample time correction, if needed.

Figure 7:
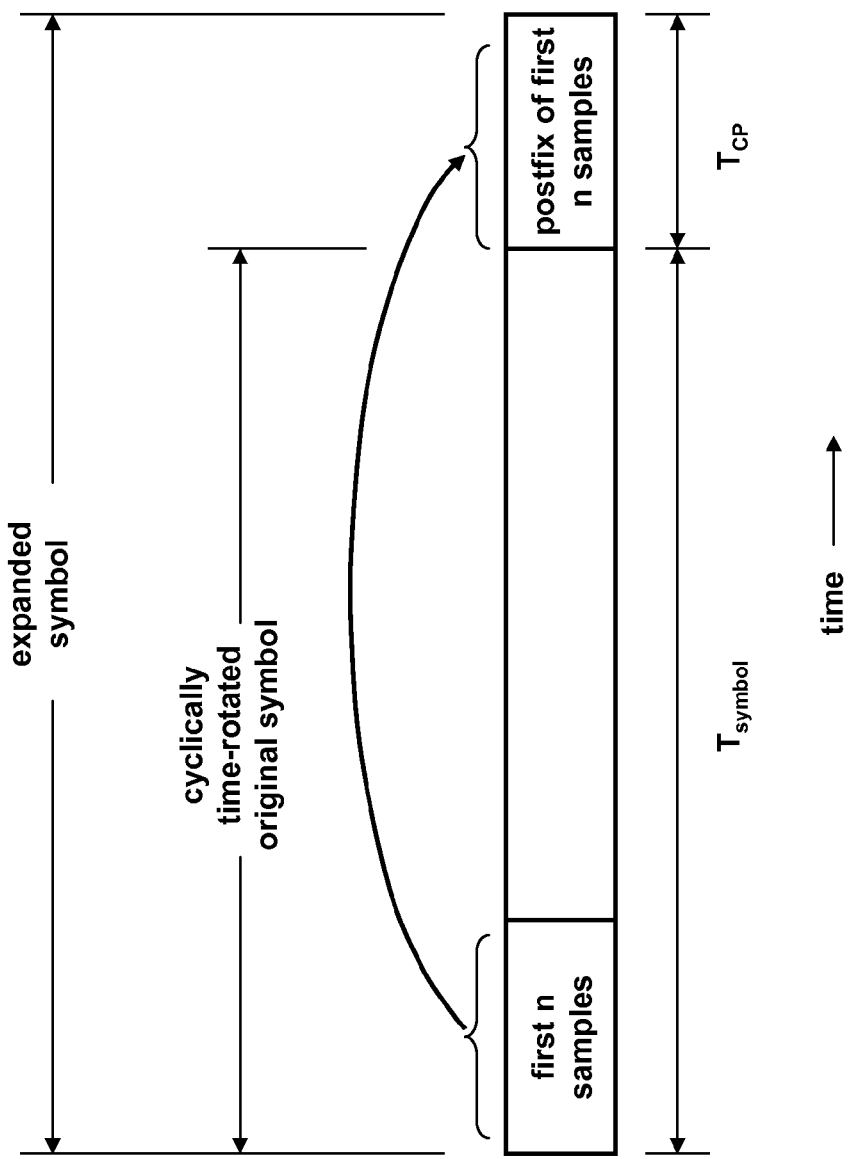
FIG. 7 illustrates a diagram of an embodiment of an expanded symbol demonstrating a cyclic postfix in accordance with the principles of the present invention.

Turning now to FIG. 7, illustrated is a diagram of an embodiment of an expanded symbol demonstrating a cyclic postfix in accordance with the principles of the present invention. To form the expanded symbol including the cyclic postfix, the first n samples of the symbol are replicated and placed at the end of the symbol to form an expanded symbol. In FIG. 7, $T_{CP}$ represents the time duration or, equivalently, the number of samples, of the cyclic postfix (or prefix).

The symbol generated by the iDFT is modified, as introduced herein, so that the cyclic prefix will appear cyclically rotated in time to the beginning of the symbol when transformed into the time domain. An equivalent time cyclical rotation is performed before the DFT. This time rotation may be structured so that it will achieve a rotation equivalent to a delay of the length of the cyclic prefix in samples after the iDFT.

As the whole DFT and iDFT operation can be viewed as an interpolation process with a rate R=(iDFT length)/(DFT length), the cyclical time pre-rotation before the DFT should be done on CPL/R samples before the DFT, where "CPL" refers to the length in samples of the cyclic prefix or postfix as appropriate. This would lead to an effective cyclical rotation of the cyclic postfix samples after the iDFT, and thus the cyclic postfix would have been made to appear before the rest of the symbol. To complete the expanded up-sampled symbol, initial samples of the up-sampled symbol are repeated at the end thereof as a cyclic postfix (also referred to as "cyclic postfix samples").

Directly applying this process may lead to a limitation. If CPL/R is not an integer number, a time rotation of a non-integer number of samples may need to be performed. A solution would be rotating ceil (CPL/R) samples, where the function "ceil" represents rounding up to the next higher integer value. This would rotate the symbol in the output of the iDFT by R·ceil (CPL/R)–CPL samples too far, which would normally result in an error of an integer number of samples "I" and a fractional number. The fractional number can be corrected with the same systems, subsystems or modules that are normally used to correct a normal fractional timing error in the transmitter that can include a delay in the frequency domain for the time before the iDFT.

The integer number a) can be corrected by adding an integer to "I" corresponding to the value of the fractional part or b) it can just be assumed, and then after the iDFT, skip (and buffer) the first "I" samples, start the transmission after the "I" samples, continue buffering during the cyclic postfix samples, and at the end of the symbol transmit the first buffered "I" samples followed by the cyclic postfix samples. Option a) is a preferred but not limiting arrangement because it would reduce the buffering needs to just the maximum cyclic postfix length. Option b) would need a buffer of size CPL+max(I) for all possible DFT and iDFT length combinations for the communication system.

A further effect may also be taken into account. If a frequency offset is applied to the data sequence when mapping the result of the DFT to the iDFT, this frequency offset is equivalent to multiplying the time domain signal by $e^{[-2\pi j \cdot n \cdot (\text{offset}/N_f)]}$, wherein:

offset=the frequency offset in number of applied subcarriers, $j=(-1)^{1/2}$, $N_f$=number of frequency domain coefficients in an SC-FDMA or similar symbol, i.e., each symbol contains $N_f$ frequency-domain coefficients, n=index of the time-domain sample, and e=Euler's number, 2.71828 . . . .

The symbol ^ represents exponentiation. If the symbol is generated as described in accordance with FIG. 6, appending the end of the symbol at the beginning as a cyclic prefix, the phase of the carrier at the beginning of the transmission would be $2\pi \cdot CPL \cdot (\text{offset}/N_f)$.

With the process introduced herein, the phase at the beginning of the transmission would be zero. Thus, a constant correction of the phase of $e^{[2\pi j \cdot PL \cdot (\text{offset}/N_f)]}$ should be applied to all samples in the chain, where PL is the resulting size in samples rotation. That is, the phase correction can be made before the DFT, between the DFT and the iDFT, or after the iDFT. An advantageous place for the phase correction would be before the iDFT, with the fractional time compensation being performed by adding this constant factor to the correcting term. With the process introduced herein, there need be no difference between the time-domain generated signal after prefix or postfix insertion compared to a conventional process or the process described by Anikhindi.

Figure 8A:
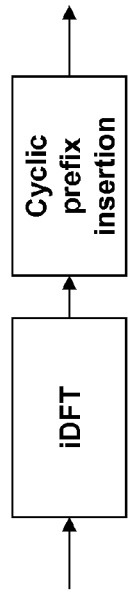
FIGS. 8A to 8D illustrate diagrams of an embodiment of a system for generating an expanded symbol including a cyclic postfix in accordance with the principles of the present invention in comparison to conventional systems.
Figure 8B:
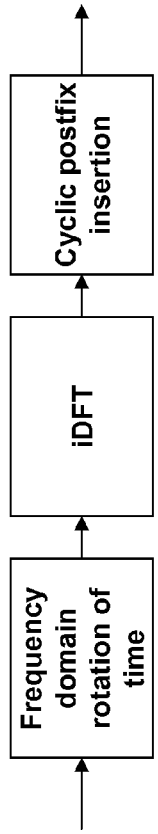

Turning now to FIGS. 8A to 8D, illustrated is a diagram of an embodiment of a system for generating an expanded symbol including a cyclic postfix in accordance with the principles of the present invention in comparison to conventional systems. FIG. 8A illustrates a conventional system wherein an iDFT is performed on a symbol formed, for example, with samples of a constellation of admissible samples in the complex plane. A cyclic prefix is inserted after iDFT processing. FIG. 8B illustrates a system as described by Anikhindi, wherein a rotation of time is performed in the frequency domain to insert a cyclic postfix, followed by execution of an iDFT process on the resulting symbol, and then insertion of a cyclic postfix. The method includes a cyclic postfix and a frequency-domain time offset process.

Figure 8C:
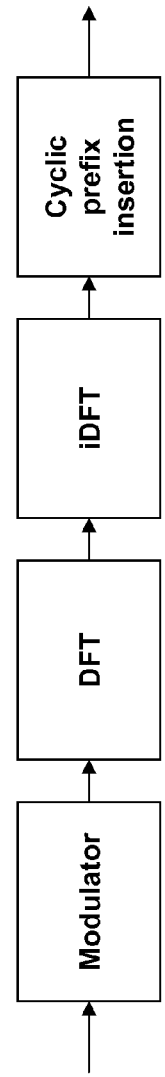

FIG. 8C illustrates a system to insert a cyclic prefix in a conventional SC-FDMA communication system. Data such as a digital representation of a voice signal or data such as elements of a video frame are supplied to a modulator that maps the data into complex-valued constellation samples, and aggregates the samples into a sequence of samples. A DFT is then performed on the symbols to map the data into complex-valued samples in the frequency plane. An iDFT is performed to construct a time domain sequence of samples that corresponds to an up-sampled version of the sequence, which was input to the DFT. Then, a cyclic prefix is inserted.

Figure 8D:
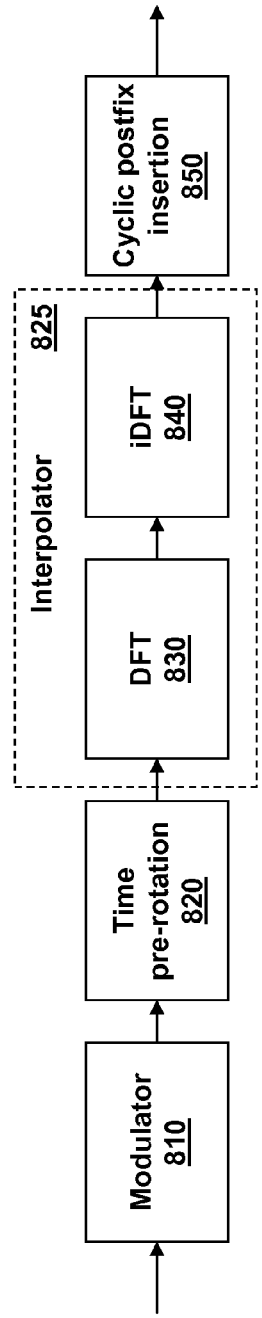

FIG. 8D illustrates an embodiment of a system starting with data (e.g., digital data) to produce a time-domain sampled waveform with a cyclic postfix in accordance with principles of the present invention. As in a conventional SC-FDMA communication system, the digital data are supplied to a modulator 810 that maps the data into complex-valued constellation samples, and aggregates the samples into a symbol. In a time pre-rotation module 820, time pre-rotation is performed wherein at least one of the ending samples (or bits thereof) are time shifted to the beginning of the symbol to form a time-rotated symbol. It should be noted that the time pre-rotation can also be performed by reordering the bits before the modulator 810 so that the modulated samples would correspond to the output of the time pre-rotation module 820. In a DFT module 830, a DFT is performed on the time-rotated symbol to map the data into complex-valued samples in the frequency plane. In an iDFT module 840, an iDFT is performed on the complex-valued samples to construct an up-sampled symbol in the time domain. The DFT module 830 and iDFT module 840 form a portion of an interpolator 825 to construct the up-sampled symbol from the time-rotated symbol. In a cyclic postfix module 850, a cyclic postfix is inserted at an end of the up-sampled symbol to form an expanded up-sampled symbol. The cyclic postfix includes at least one initial sample of the up-sampled symbol. Additionally, the modulator 810, the time pre-rotation module 820, the interpolator 825 and the cyclic postfix module 850 may be embodied in a processor or transceiver of an apparatus such as the communication element illustrated and described with respect to FIG. 5.

Turning now to FIGS. 9A to 9C, illustrated are diagrams demonstrating exemplary waveforms corresponding to the conventional SC-FDMA communication system of FIG. 8C. In the exemplary waveforms, the DFT length is 128 samples, the iDFT length is 2048 transform samples, and the cyclic prefix length is 128. The modulator produces a complex-valued symbol including 128 sample values. An exemplary time-dependent waveform is illustrated by FIG. 9A. After the iDFT process, an up-sampled complex-valued waveform is produced, as illustrated by FIG. 9B, corresponding to the original time-dependent waveform of FIG. 9A. Note that this signal may be also shifted in frequency, but for the shake of simplicity, the shift in frequency has been omitted. To provide cyclic prefix insertion, the samples after the iDFT process are inserted at the beginning of the waveform as illustrated by FIG. 9C.

Turning now to FIGS. 10A to 10D, illustrated are diagrams demonstrating exemplary waveforms corresponding to a system for generating an expanded symbol including a cyclic postfix in accordance with the principles of the present invention of FIG. 8D. In the exemplary waveforms, the DFT length is again 128 samples, the iDFT length is 2048 transform samples, and the cyclic postfix length is 128 transform samples. The time-dependent sampled waveform of FIG. 10A illustrates the original complex-valued symbol, and identifies the end portion 1010 of the waveform that is cyclically reinserted as a prefix. In FIG. 10B, the end portion 1010 of the waveform has been inserted as portion 1020 at the beginning of the waveform before the DFT process (i.e., cyclically rotated symbol before DFT). FIG. 10C demonstrates the waveform from FIG. 10B after the DFT and iDFT operation and the result is an up-sampled version thereof (i.e., symbol after iDFT). In FIG. 10D, the cyclic prefix 1040 corresponding to the initial portion 1030 of the transformed waveform (see FIG. 10C) is inserted at the end of the transformed waveform to form the end portion 1050 of the expanded transformed waveform (i.e., symbol after cyclic postfix insertion). In this example, the length of the expanded transformed waveform to be transmitted is now 2176 transform samples.

An advantage of this solution is that it provides a system, subsystem or module to produce mathematically the same result as appending a cyclic prefix, but using a less resource-intensive postfix process. In this new process, latency and buffering are advantageously reduced. The result is a transmitted waveform that is the same as that produced by conventional cyclic prefix processing steps, but advantageously requires less processing resources and results in less processing latency.

In one embodiment, the present invention provides an apparatus (e.g., user equipment or a base station) including a modulator configured to map data into complex-valued constellation samples and aggregate the samples into a symbol. The apparatus also includes a time pre-rotation module configured to time shift bits of at least one of ending samples of the symbol to a beginning of the symbol to form a time-rotated symbol. The apparatus also includes an interpolator configured to construct an up-sampled symbol from the time-rotated symbol. The interpolator may include a discrete Fourier transform module configured to map the time-rotated symbol into complex-valued samples in a frequency plane, and an inverse discrete Fourier transform module configured to construct the up-sampled symbol in a time domain from the complex-valued samples. The interpolator is configured to apply a phase correction to at least one of samples of the time-rotated symbol, the complex-valued samples and samples of the up-sampled symbol. The apparatus still further includes a cyclic postfix module configured to insert a cyclic postfix (e.g., at least one of initial samples of said up-sampled symbol) at an end of the up-sampled symbol to form an expanded up-sampled symbol. A length of the cyclic postfix is a function of a ratio of a number of coefficients of an inverse discrete Fourier transform module employed by the inverse discrete Fourier transform module to a number of coefficients of a discrete Fourier transform employed by the discrete Fourier transform module and corrected for fractional numbers.

Program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
   time pre-rotation module configured to time shift bits of at least one of ending samples of a symbol to a beginning of said symbol to form a time-rotated symbol;
   an interpolator configured to construct an up-sampled symbol from said time-rotated symbol; and
   a cyclic postfix module configured to insert a cyclic postfix at an end of said up-sampled symbol to form an expanded up-sampled symbol,
   wherein said interpolator comprises:

a discrete Fourier transform module configured to map said time-rotated symbol into complex-valued samples in a frequency plane; and an inverse discrete Fourier transform module configured to construct said up-sampled symbol in a time domain from said complex-valued samples, and wherein a length of said cyclic postfix is a function of a ratio of a number of coefficients of an inverse discrete Fourier transform employed by said inverse discrete Fourier transform module to a number of coefficients of a discrete Fourier transform employed by said discrete Fourier transform module and corrected for fractional numbers.

2. The apparatus as recited in claim 1 wherein said bits of said at least one of said ending samples comprises all of said bits thereof.

3. The apparatus as recited in claim 1 wherein said cyclic postfix comprises at least one of initial samples of said up-sampled symbol.

4. The apparatus as recited in claim 1 further comprising a modulator configured to map data into complex-valued constellation samples and aggregate said samples into said symbol.

5. The apparatus as recited in claim 1 wherein said time pre-rotation module is configured to apply a phase correction to samples of said symbol in accordance with forming said time-rotated symbol.

6. The apparatus as recited in claim 1 wherein said interpolator is configured to apply a phase correction to at least one of samples of said time-rotated symbol, said complex-valued samples and samples of said up-sampled symbol.

7. The apparatus as recited in claim 1 wherein said time pre-rotation module, said interpolator and said cyclic postfix module are embodied in at least one of a processor and a transceiver.

8. The apparatus as recited in claim 1 wherein said apparatus is operable in a single carrier-frequency division multiple access communication system.

9. An apparatus, comprising:
means for time shifting bits of at least one of ending samples of a symbol to a beginning of said symbol to form a time-rotated symbol;
first means for constructing an up-sampled symbol from said time-rotated symbol; and
means for inserting a cyclic postfix at an end of said up-sampled symbol to form an expanded up-sampled symbol,
wherein said first constructing means comprises:
means for mapping said time-rotated symbol into complex-valued samples in a frequency plane, and
second means for constructing said up-sampled symbol in a time domain from said complex-valued samples, and
wherein a length of said cyclic postfix is a function of a ratio of a number of coefficients of an inverse discrete Fourier transform employed by said second constructing means to a number of coefficients of a discrete Fourier transform employed by said mapping means and corrected for fractional numbers.

10. A computer program product comprising a program code stored in a non-transitory computer readable medium configured to shift bits of at least one of ending samples of a symbol to a beginning of said symbol to form a time-rotated symbol, construct an up-sampled symbol from said time-rotated symbol, and insert a cyclic postfix at an end of said up-sampled symbol to form an expanded up-sampled symbol,
wherein said program code stored in said computer readable medium is configured to construct said up-sampled symbol by mapping said time-rotated symbol into complex-valued samples in a frequency plane, and constructing said up-sampled symbol in a time domain from said complex-valued samples, and
wherein a length of said cyclic postfix is a function of a ratio of a number of coefficients of an inverse discrete Fourier transform to a number of coefficients of a discrete Fourier transform and corrected for fractional numbers.

11. A method, comprising:
time shifting bits of at least one of ending samples of a symbol to a beginning of said symbol to form a time-rotated symbol;
constructing an up-sampled symbol from said time-rotated symbol; and
inserting a cyclic postfix at an end of said up-sampled symbol to form an expanded up-sampled symbol,
wherein said constructing said up-sampled symbol, comprises:
mapping said time-rotated symbol into complex-valued samples in a frequency plane, and
constructing said up-sampled symbol in a time domain from said complex-valued samples, and
wherein a length of said cyclic postfix is a function of a ratio of a number of coefficients of an inverse discrete Fourier transform to a number of coefficients of a discrete Fourier transform and corrected for fractional numbers.

12. The method as recited in claim 11 wherein said bits of said at least one of said ending samples comprises all of said bits thereof.

13. The method as recited in claim 11 wherein said cyclic postfix comprises at least one of initial samples of said up-sampled symbol.

14. The method as recited in claim 11 further comprising mapping data into complex-valued constellation samples and aggregating said samples into said symbol.

15. The method as recited in claim 11 further comprising applying a phase correction to at least one of samples of said time-rotated symbol, said complex-valued samples and samples of said up-sampled symbol.

* * * * *